United States Patent
Hansen

(10) Patent No.: US 9,971,457 B2
(45) Date of Patent: May 15, 2018

(54) AUDIO AUGMENTATION OF TOUCH DETECTION FOR SURFACES

(71) Applicant: Intel Corporation, Santa Clara, CA (US)

(72) Inventor: Carl C. Hansen, Aloha, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days. days.

(21) Appl. No.: 14/752,796

(22) Filed: Jun. 26, 2015

(65) Prior Publication Data
US 2016/0378219 A1  Dec. 29, 2016

(51) Int. Cl.
| G06F 3/043 | (2006.01) |
| G06F 3/041 | (2006.01) |
| G06F 3/042 | (2006.01) |
| G06F 3/16  | (2006.01) |

(52) U.S. Cl.
CPC .......... *G06F 3/0425* (2013.01); *G06F 3/0416* (2013.01); *G06F 3/167* (2013.01); *G06F 2203/04101* (2013.01)

(58) Field of Classification Search
CPC ...... G06F 1/1626; G06F 1/1632; G06F 1/166; G06F 1/1673; G06F 3/017; G06F 3/038; G06F 3/0426; G06F 3/04886; G06F 2200/1633; G01S 17/06
See application file for complete search history.

(56) References Cited

U.S. PATENT DOCUMENTS

| 2003/0132950 A1* | 7/2003 | Surucu ................ G06F 1/1626 715/700 |
| 2004/0046744 A1 | 3/2004 | Rafii et al. |
| 2006/0158435 A1 | 7/2006 | Lin et al. |
| 2011/0175813 A1* | 7/2011 | Sarwar ................. G06F 3/016 345/168 |
| 2012/0069169 A1* | 3/2012 | Dejima ............... G06F 3/0426 348/77 |
| 2013/0155029 A1 | 6/2013 | Morrison et al. |
| 2014/0267598 A1* | 9/2014 | Drouin ............... G03H 1/0005 348/40 |
| 2015/0002475 A1 | 1/2015 | Tiao et al. |

FOREIGN PATENT DOCUMENTS

WO    WO-2009107935    9/2009

OTHER PUBLICATIONS

Intel RealSense Technology, "SDK Design Guidelines Version 2," 2014, 57 pages.
International Search Report and Written Opinion for PCT Application No. PCT/US2016/034192 dated Aug. 26, 2016, 13 pages.

* cited by examiner

*Primary Examiner* — Nelson Rosario
(74) *Attorney, Agent, or Firm* — Womble Bond Dickinson (US) LLP

(57) ABSTRACT

Embodiments are generally directed to audio augmentation of touch detection for surfaces. An apparatus may include a pedestal, the pedestal including an audio sensor to detect a vibration from a surface on which the apparatus is placed; an arm coupled with the pedestal; and a head element coupled with the arm, wherein the head element includes a visual sensor to detect location of an object in relation to the surface.

10 Claims, 5 Drawing Sheets

AUDIO AUGMENTATION OF TOUCH DETECTION FOR SURFACES

TECHNICAL FIELD

Embodiments described herein generally relate to the field of electronic systems and, more particularly, to audio augmentation of touch detection for surfaces.

BACKGROUND

Electronic devices have commonly used touch sensitive surfaces for control, including touch screens of tablet computers and other similar devices. However, touch sensitive surfaces are greatly limiting and thus certain systems instead utilize non-sensitive surfaces, with the touch operation being detected by judging visually when a user has made contact with a non-touch surface.

However, accurately detecting a touch on a surface requires a high degree of precision. In particular, detecting the difference between a touch on a surface and a finger or hand hovering closing to the surface is difficult to discern, and may result in a significant number of errors, both in detecting touches that were not intended and failing to detect intended touches.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
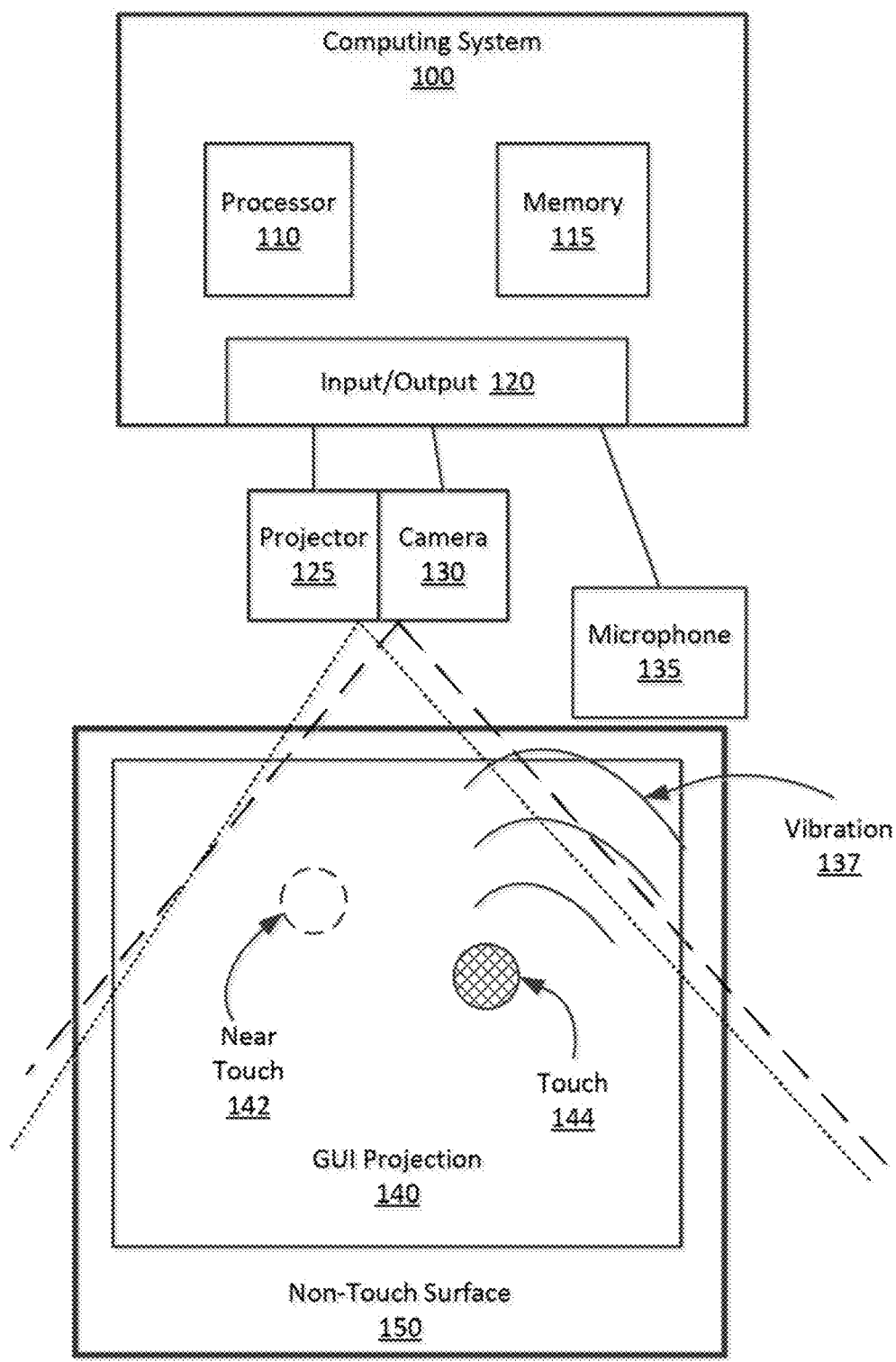
FIG. 1 is an illustration of a system for audio augmentation of touch detection for surfaces.

Embodiments described herein are generally directed to audio augmentation of touch detection for surfaces.

For the purposes of this description:

"Non-touch surface" or "non-touch sensitive surface' means any surface that does not include touch sensitivity.

In a computer operation, it is possible to project some or all of a computer screen onto a surface, such as a remote, non-touch surface, using a projector element. In order to provide for touch operations on a non-touch sensitive surface, where the non-touch sensitive surface can be any surface, including, but not limited to, a surface such as a desk top or table top, a conventional system commonly utilizes a visual sensor such as a depth camera (also referred to as time-of-flight camera or ranging camera) that in general determines a distance for each point of an image. A depth camera may include, for example, an Intel RealSense™ camera or a camera of the variety embedded in certain gaming consoles. The depth camera will measure the distance of the fingertips of the user from the surface to detect a touch event. Typical depth camera implementations perform a "hull detection" to verify that an actual arm/hand is over a projection and then focus on the fingertips to detect the actual touch event.

However, a conventional implementation such as this can provide inaccurate results because the depth camera is generally unable to detect the actual fine-grained touch event at a distance due to camera noise and lack of depth resolution. If a depth camera is used, then it is generally necessary that the camera be near the portion of the surface being utilized and be carefully located.

Further, in a conventional operational it is necessary that no objects or portion of the hands or arms of the user obstruct the view of the depth camera as it will not be possible to detect a touch event if the portion of the surface being touched is not in clear view. For this reason, even a highly accurate depth camera may provide inaccurate results.

In some embodiments, an apparatus, system, or method includes use of audio sensing to augment visual sensing of touch events. In some embodiments, a technique assists in application of an algorithm to improve accuracy of "time of touch" detection.

In some embodiments, an apparatus, system, or method detects a touch event only if there is both a visual detection of an object, such as a finger of a hand of a user, that is close to and moving towards the surface, and an audio detection of a vibration (where vibrations include sound waves) associated with a touch event. In some embodiments, the audio augmented touch sensing may be implemented to improve touch accuracy and speed on a remote non-touch surface, where, for example, a projection of a Windows desktop is projected. While this description generally refers to a surface such as a desk top or table top, embodiments are not limited such physical surfaces. For example, non-touch surfaces are not limited to flat surfaces, and may include surfaces with curving or irregularities. Further, the non-touch surface may include items placed on top of a physical surface, where placing items on the physical surface may operation to expand the non-touch surface to include the surfaces of the items that are placed on the physical surface.

An embodiment of a process for audio augmentation of touch sensing may include:

1. Locate hull (hand) in projection area with depth camera;
2. Locate fingertips in hull with depth camera;
3. Using depth camera detect finger close to surface and enable microphone;
4. When microphone detects vibration AND fingertip is moving towards surface, declare touch event.

Figure 5:
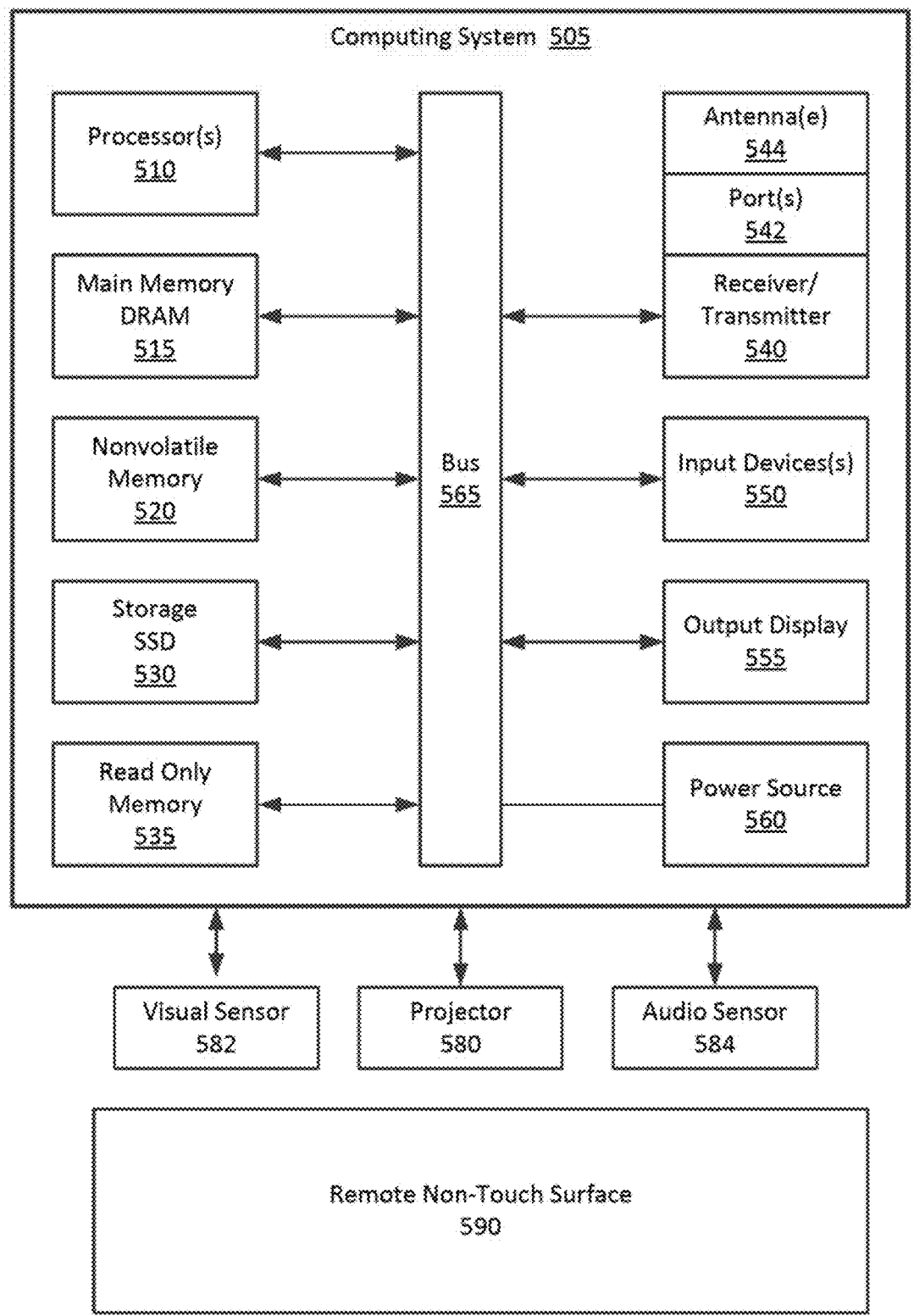
FIG. 5 is an illustration of an embodiment of an electronic apparatus or system including audio augmentation of touch detection for surfaces according to an embodiment.

FIG. 1 is an illustration of a system for audio augmentation of touch detection for surfaces. In some embodiments, a computing system to provide touch detection on non-touch surfaces 100 includes a processor 110 for processing of touch inputs, a memory 115 for storage of data, and one or more input/output connections 120. In some embodiments, the computing system includes connections for an imaging element, illustrated as projector 125; one or more visual sensors, illustrated as camera 130; and one or more audio sensors, illustrated as microphone 135. In some embodiments, the camera 130 is a depth camera. While the projector 125, camera 130, and microphone 135 are illustrated as being external elements, embodiments are not limited to this implementation, and may include one or more of such elements incorporated into the computing system 100. Additional elements of the computing system 100 may be as illustrated in FIG. 5. For purposes of explanation, FIG. 1 illustrates the projector and camera having a similar field of view (such that the camera 130 would generally see the same area as the area for projection by the projector 215). However, embodiments are not limited to this particular implementation. For example, the area that may be used for projection of the input image would not necessarily limit the area that may be used for touch operations, as the user, may, for example, provide touch gestures (such as, for example, a side swipe on the surface) that are at least in part outside of the projected area.

As illustrated in FIG. 1, the projector 125 is to provide for projection of a user input image, including, but not limited to, a graphical user interface (GUI) projection 140, virtual keyboard, or other image providing user input. As illustrated in FIG. 1, the GUI projection 140 is projected by the projector onto a non-touch surface 150, such the surface of a desk, table, or counter.

In some embodiments, the computing system 100 is to provide for audio augmentation of touch detection on surfaces. In some embodiments, the computing system utilizes vibration 137, including sound vibrations, detected by the microphone 135 to augment the visual detection of touch by the camera 130. In some embodiments, the computing system operates to discern between, for example, a near touch 142 and an actual touch 144 based at least in part on the vibration 137 generated by the touch 144 on the non-touch surface 150.

In some embodiments, the microphone 135 may be coupled with or in contact with the non-touch surface 150 or a structure attached to the non-touch surface 150, whereby vibrations of the surface 150 reach the microphone 135. However, embodiments are not limited to this implementation, and may include location of a microphone 135 separate from the non-touch surface 150, the microphone detecting sound wave vibrations through the air.

In some embodiments, the computing system operates to enable the audio sensor 135 (which includes enabling a connection to the microphone or a circuit amplifying vibration signals) when a finger (or, in general, an object or a touch element) is within a certain threshold distance from the non-touch surface. In some embodiments, computing system detects a touch 144 when the camera 130 detects the finger of a user moving towards the surface 140 and the microphone 135 detects a vibration. In some embodiments, the computing system 100 includes knowledge of a signature of the vibration or sound associated with a touch event on a surface, the detection of a touch including signal processing of received signals to compare with the signature of the touch event.

Figure 2:
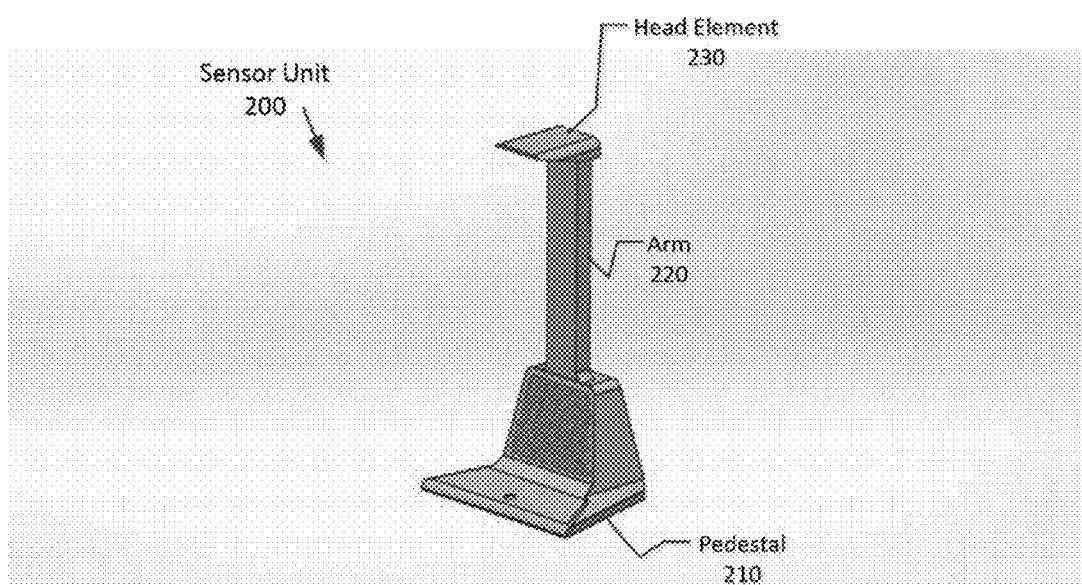
FIG. 2 is an illustration of an embodiment of sensor unit for a non-touch sensitive surface to provide audio augmentation for touch detection according to an embodiment.

FIG. 2 is an illustration of an embodiment of sensor unit for a non-touch sensitive surface to provide audio augmentation for touch detection according to an embodiment. In the particular implementation shown in FIG. 2, a sensor unit 200 is in a shape similar to a desk lamp, and may provide lighting in addition to sensing operation.

In some embodiments, a sensor unit 200 includes a pedestal 210 (or base), an arm 220 coupled with the pedestal 210, and a head element 230 coupled with the arm 220. In some embodiments, the sensor unit may be coupled with or in contact with a non-touch sensitive surface (which is not illustrated in FIG. 2).

In some embodiments, the pedestal 210 of the sensor element 200 includes a microphone for detection of vibration. In some embodiments, the pedestal is connected (by wired or wireless connection) with a computing system, the microphone in the pedestal being sensed by the computing system to provide audio augmentation of touch detection for the non-touch sensitive surface. In some embodiments, the microphone embedded in the pedestal 210 may be a simple, inexpensive microphone to sense sound waves (vibration) of the non-touch surface when the touch event happens. As a solid surface is generally an excellent conductor of vibrations, a complex audio sensor is not required for audio augmentation operation.

In some embodiments, the sensor unit may further include a visual sensor (such as a depth camera) in the head element 230 of the sensor unit 200. In such an implementation, the visual sensing and audio sensing are both provided in a convenient unit, wherein the audio sensor has good vibration connection to the surface, and the visual sensor may have a generally unobstructed view of the surface. In some embodiments, the head element 230 may further include a projector for the projection of an image, including the projection of image on a surface for touch detection operation.

In some embodiments, the sensor unit 200 includes a wired or wireless interface for connection with a computing system. In some embodiments, the sensor unit 200 may be operable to connect with the computing system by Bluetooth™ or other wireless communication. In some embodiments, the sensor unit 200 may include a connector for connection with the computer system by a wired connection, including, for example, an HDMI™ (High Definition Multimedia Interface) or USB (Universal Serial Bus) connector, wherein the connector may be, for example, included in the pedestal. In some embodiments, the arm 220 may include wiring to provide a connection between the head unit 230 and the pedestal 210.

Figure 3:
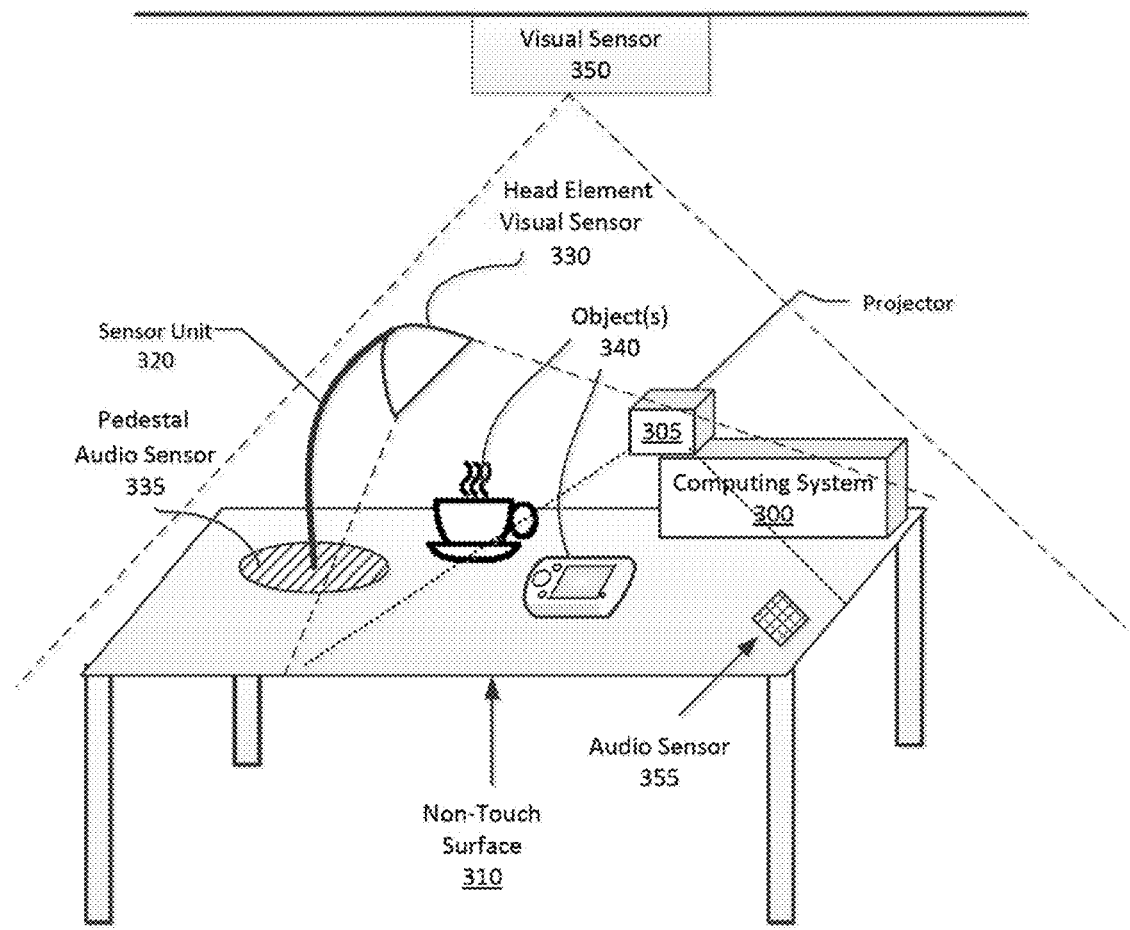
FIG. 3 illustrates a system for audio augmentation of touch detection on surfaces according to an embodiment.

FIG. 3 illustrates a system for audio augmentation of touch detection on surfaces according to an embodiment. In some embodiments, a computing system 300 provides for audio augmentation of touch detection for a non-touch surface 310, shown as the surface of a desk. In some embodiments, the computer system may include a projector 305 to project an input image (such as a GUI) on the non-touch surface 310. In some embodiments, the computing system 300 includes or is coupled with at least one visual sensor (such as a depth camera) and at least one audio sensor (such as a simple microphone), the visual sensor and audio sensor being used jointly to project quick and accurate detection of touch events on the surface 310. While for ease of illustration the computer system 300 is shown having a particular cover shape (such as, for example, a desktop personal computer) and being set on the surface 310, embodiments are not limited to this example. The computing system 300 may have any shape (including a laptop or notebook computer) and may not be located on the desk surface 310.

In some embodiments, an audio sensor may include a microphone in a pedestal 335 of a sensor unit 320, which may include the sensor unit 200 illustrated in FIG. 2. In some embodiments, the sensor unit 320 may further include a visual sensor 330 in a head element of the sensor unit 320, wherein the visual sensor 330 is provided a clear view of the non-touch surface 310, without significant obstruction from objects 340, shown as a coffee cup and a mobile device, that may be placed on the surface 310. In some embodiments, the head element may further include a projector element for projection of an image on the surface 310. However, embodiments are not limited to the use of the sensor unit 320. In some embodiments, an audio sensor 355 may be placed on the non-touch surface, may be clamped to such surface, may be embedded within the surface, or may be located elsewhere in the proximity of the surface. In some embodiments, a visual sensor may be separated from the audio sensor, including, for example, a visual sensor 350 attached to a ceiling above the surface 310.

Figure 4:
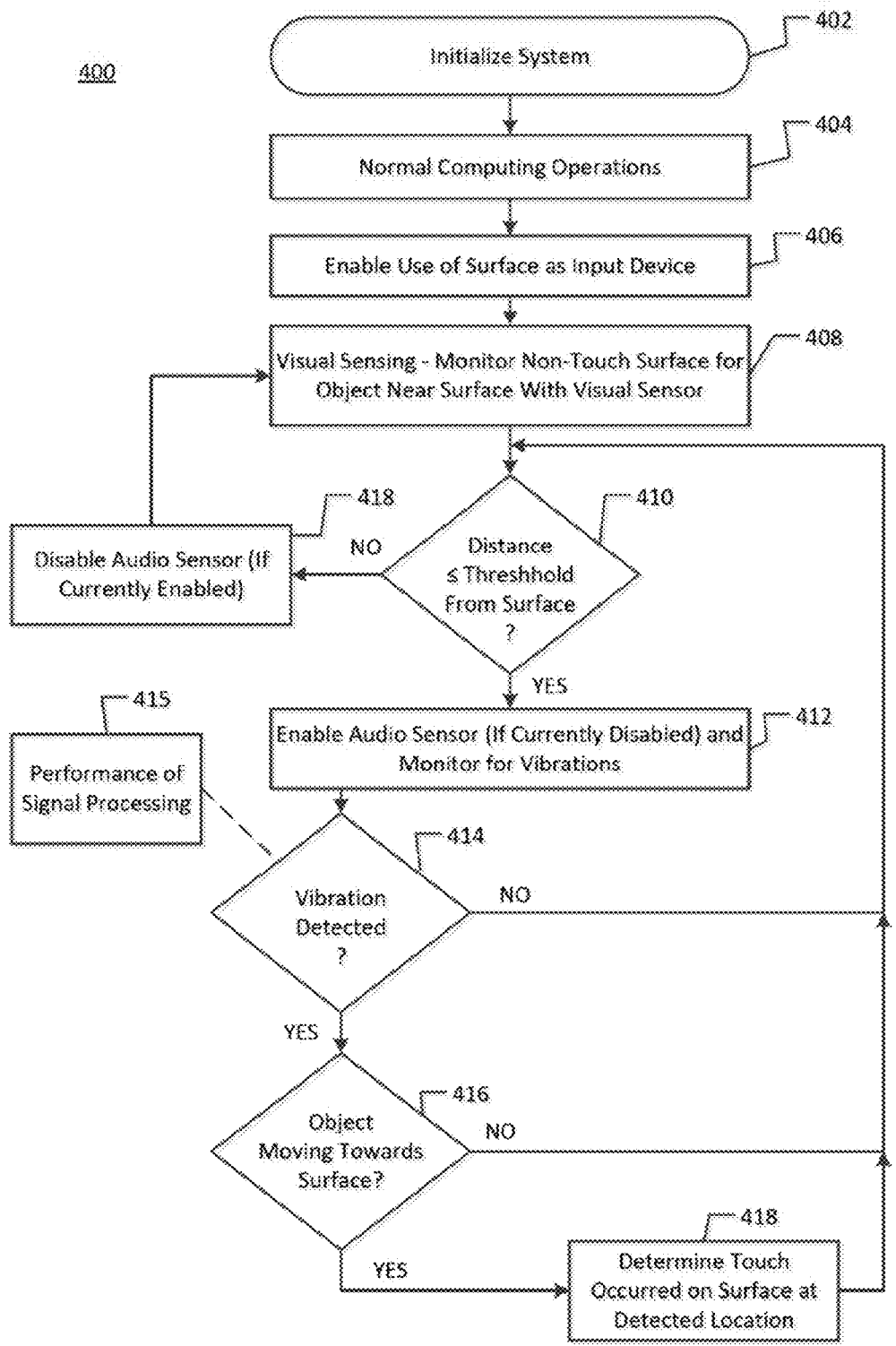
FIG. 4 is a flowchart to illustrate a process for audio augmentation of touch detection according to an embodiment.

FIG. 4 is a flowchart to illustrate a process for audio augmentation of touch detection according to an embodiment. In some embodiments, a process 400 for audio augmentation of touch detection includes initializing a system 402, and engaging in normal computer operations 404. In some embodiments, the computing system may enable a surface, such as a non-touch surface, as an input device 406, which may include projecting an input image on the surface for user input operations.

In some embodiments, the process continues for visual sensing including monitoring of the surface with the visual sensor for an object, which may be a particular object such as one or more fingers of the user or other touch element, that is near the surface 408. Upon the object being close to the surface, such as at a distance that is less than or equal to a certain threshold 410, then an audio sensor is enabled (if currently disabled) and operates to monitor for vibrations 412. In some embodiments, if the audio sensor detects a vibration from the surface 414 and the visual sensor detects the object moving towards the surface 416, a determination is made that a touch occurred on the surface at a particular detected location. In some embodiments, the detection of a vibration from the surface 414 includes signal processing 415 of a received vibration signal, wherein the signal processing may include comparing the received vibration signal with a signature for a touch event. FIG. 4 illustrates an implementation of a particular algorithm for the recognition of a vibration audio augmentation of touch sensing, but embodiments are not limited to this particular algorithm. In other implementations, different signal processing operations may be applied to detect a vibration associated with a touch event. In some embodiments, the choice of a particular algorithm may depend on the particular environment, type of surface, type of audio sensor, and other factors.

Upon a touch being detected or not detected 414-418, the process returns to determining whether an object within a certain threshold from the surface 410, and, upon the distance being found to be greater than the threshold, disabling the audio sensor (if currently enabled) 418 so sounds are not monitored when no touch event is imminent.

FIG. 5 is an illustration of an embodiment of an electronic apparatus or system including audio augmentation of touch detection for surfaces according to an embodiment. In this illustration, certain standard and well-known components that are not germane to the present description are not shown. Elements shown as separate elements may be combined, including, for example, an SoC (System on Chip) combining multiple elements on a single chip. The apparatus or system (referred to generally as a system 500) may include, but is not limited to, a computing system.

In some embodiments, the a system 500 is coupled with or includes a projector 580 to project an input image on a surface such as a remote non-touch surface 590, and a visual sensor 582 (such as a depth camera) and audio sensor 584 (such as a microphone) to provide augmented detection of touch events on the surface 590.

In some embodiments, the system 500 may include a processing means such as one or more processors 510 coupled to one or more buses or interconnects for processing information, shown in general as bus 505. The processors 510 may comprise one or more physical processors and one or more logical processors. In some embodiments, the processors may include one or more general-purpose processors or special-processor processors.

The bus 505 is a communication means for transmission of data. The bus 505 is illustrated as a single bus for simplicity, but may represent multiple different interconnects or buses and the component connections to such interconnects or buses may vary. The bus 505 shown in FIG. 5 is an abstraction that represents any one or more separate physical buses, point-to-point connections, or both connected by appropriate bridges, adapters, or controllers.

In some embodiments, the system 500 further comprises a random access memory (RAM) or other dynamic storage device or element as a main memory 515 for storing information and instructions to be executed by the processors 510. Main memory 515 may include, but is not limited to, dynamic random access memory (DRAM).

The system 500 also may comprise a nonvolatile memory 520; a storage device such as an SSD (solid state drive); and a read only memory (ROM) 535 or other static storage device for storing static information and instructions for the processors 510.

In some embodiments, the system 500 includes one or more transmitters or receivers 540 coupled to the bus 505. In some embodiments, the system 500 may include one or more antennae 544, such as dipole or monopole antennae, for the transmission and reception of data via wireless communication using a wireless transmitter, receiver, or both, and one or more ports 542 for the transmission and reception of data via wired communications. Wireless communication includes, but is not limited to, Wi-Fi, Bluetooth™, near field communication, and other wireless communication standards.

In some embodiments, system 500 includes one or more input devices 550 for the input of data, including hard and soft buttons, a joy stick, a mouse or other pointing device, a keyboard, voice command system, or gesture recognition system. In some embodiments, the remote non-touch surface 590 may operate as an input device 550 for the system 500.

In some embodiments, the system 500 includes an output display 555, where the display 555 may include a liquid crystal display (LCD) or any other display technology, for displaying information or content to a user. In some environments, the display 555 may include a touch-screen that is also utilized as at least a part of an input device 550. Output display 555 may further include audio output, including one or more speakers, audio output jacks, or other audio, and other output to the user.

The system 500 may also comprise a battery or other power source 560, which may include a solar cell, a fuel cell, a charged capacitor, near field inductive coupling, or other system or device for providing or generating power in the system 500. The power provided by the power source 560 may be distributed as required to elements of the system 500.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, an apparatus includes a pedestal, the pedestal including an audio sensor to detect a vibration from a surface on which the apparatus is placed; an arm coupled with the pedestal; and a head element coupled with the arm, the head element including a visual sensor to detect location of an object in relation to the surface.

In some embodiments, the apparatus further includes an interface for connection with a computing system.

In some embodiments, the audio sensor is operable to be turned on when the visual sensor detects the object within a threshold distance from the surface and to be turned off the visual sensor detects the object is outside the threshold distance from the surface.

In some embodiments, the visual sensor is a depth camera. In some embodiments, the audio sensor is a microphone. In some embodiments, the audio sensor is in contact with the surface.

In some embodiments, a system includes a processor to process data and instructions; an image projector to project an input image on a surface; a visual sensor to detect location of an object in relation to the surface; and an audio sensor to detect a vibration from the surface, wherein the system is to determine that a touch of the object has occurred on the surface upon the processor detecting with the visual sensor that the object is within a threshold distance from the surface and is moving towards the surface, and detecting with the audio sensor a vibration from the surface.

In some embodiments, the system is to enable the audio sensor when the object is within the threshold distance from the surface.

In some embodiments, the system is to disable the audio sensor when the object is outside the threshold distance from the surface.

In some embodiments, the visual sensor is a depth camera.

In some embodiments, the audio sensor is a microphone.

In some embodiments, the audio sensor is in contact with the surface.

In some embodiments, the processor detecting a vibration from the surface includes the processor performing signal processing of a received vibration.

In some embodiments, the performance of signal processing of a received vibration includes a comparison of the received vibration with a signature for a touch event.

In some embodiments, the surface is a non-touch sensitive surface.

In some embodiments, the object is a finger of a hand of a user.

In some embodiments, a method includes projecting an input image on a surface; monitoring the surface with a visual sensor; detecting a location of an object in relation to the non-touch surface; and determining that a touch has occurred on the surface upon the following: detecting with the visual sensor that the object is within a threshold distance from the surface and is moving towards the surface, and detecting with an audio sensor a vibration from the surface. In some embodiments, the method further includes enabling the audio sensor upon determining that the object is within the threshold distance from the surface. In some embodiments, the method further includes disabling the audio sensor upon determining that the object is outside the threshold distance from the surface.

In some embodiments, a non-transitory computer-readable storage medium having stored thereon data representing sequences of instructions that, when executed by a processor, cause the processor to perform operations including projecting an input image on a surface; monitoring the surface with a visual sensor; detecting a location of an object in relation to the non-touch surface; and determining that a touch has occurred on the surface upon the following: detecting with the visual sensor that the object is within a threshold distance from the surface and is moving towards the surface, and detecting with an audio sensor a vibration from the surface. In some embodiments, the instructions further include enabling the audio sensor upon determining that the object is within the threshold distance from the surface, and disabling the audio sensor upon determining that the object is outside the threshold distance from the surface.

In some embodiments, monitoring with a visual sensor includes monitoring with a depth camera.

In some embodiments, detecting a vibration from performing signal processing of a received vibration.

In some embodiments, performing signal processing includes comparing the received vibration with a signature for a touch event.

In some embodiments, projecting the input image on the surface includes projecting a graphical user interface (GUI) on the surface.

In some embodiments, the surface is a non-touch sensitive surface.

In some embodiments, a non-transitory computer-readable storage medium having stored thereon data representing sequences of instructions that, when executed by a processor, cause the processor to perform operations comprising: monitoring with a depth camera a non-touch sensitive surface; detecting an object with the depth camera; detecting a location of the object in relation to the surface; and determining that a touch of the object has occurred on the surface upon the following: detecting with the depth camera that the object is within a threshold distance from the surface and that the object is moving towards the surface, and detecting with an audio sensor a vibration from the surface.

In some embodiments, the medium further includes instructions for enabling the audio sensor upon determining that the object is within the threshold distance from the surface.

In some embodiments, the medium further includes instructions for disabling the audio sensor upon determining that the object is outside the threshold distance from the surface.

In some embodiments, an apparatus includes: means for monitoring with a depth camera a non-touch sensitive surface; means for detecting an object with the depth camera; means for detecting a location of the object in relation to the surface; and means for determining that a touch of the object has occurred on the surface, including means for detecting with the depth camera that the object is within a threshold distance from the surface and the object is moving towards the surface, and means for detecting with an audio sensor a vibration from the surface.

In some embodiments, the apparatus further includes means for enabling the audio sensor upon determining that the object is within the threshold distance from the surface.

In some embodiments, the apparatus further includes means for disabling the audio sensor upon determining that the object is outside the threshold distance from the surface.

What is claimed is:

1. A system comprising:
    a processor to process data and instructions;
    an image projector to project an input image on a physical surface to enable the user input to the system, the physical surface being a non-touch sensitive surface;
    a depth camera to detect location of an object in relation to the surface; and
    an audio sensor to detect a vibration from the surface, wherein the system is to enable the audio sensor when the object is within a threshold distance from the physical surface and is to disable the audio sensor when the object is outside the threshold distance from the physical surface;
    wherein the system is to determine that a touch of the object within the projected input image on the physical surface has occurred upon the processor:
        detecting with the depth camera that the object is within the threshold distance from the physical surface and that the object is moving towards the physical surface,
        enabling the audio sensor to monitor for vibration in response to detecting that the object is within the threshold distance from the physical surface, and
        while the object is within the threshold distance and is moving towards the physical surface, detecting with the audio sensor a vibration from the physical surface.

2. The system of claim 1, wherein the audio sensor is a microphone.

3. The system of claim 1, wherein the audio sensor is in contact with the physical surface.

4. The system of claim 1, wherein the processor detecting a vibration from the physical surface includes the processor performing signal processing of a received vibration.

5. The system of claim 4, wherein the performance of signal processing of a received vibration includes a comparison of the received vibration with a signature for a touch event.

6. The system of claim 1, wherein the object is a finger of a hand of a user.

7. A non-transitory computer-readable storage medium having stored thereon data representing sequences of instructions that, when executed by a processor, cause the processor to perform operations comprising:
    projecting an input image on a physical surface to enable user input to the system, the physical surface being a non-touch sensitive surface;
    monitoring with a depth camera the physical surface;
    detecting with the depth camera a location of an object in relation to the physical surface;
    monitoring with an audio sensor for vibration from the physical surface, including enabling the audio sensor upon determining that the object is within a threshold distance from the physical surface and disabling the audio sensor upon determining that the object is outside the threshold distance from the physical surface; and
    determining that a touch of the object within the projected input image on the physical surface has occurred upon the following:
        detecting with the depth camera that the object is within the threshold distance from the physical surface and that the object is moving towards the physical surface, enabling the audio sensor to monitor for vibration in response to detecting that the object is within the threshold distance from the physical surface, and
        while the object is within the threshold distance and is moving towards the surface, detecting with an audio sensor a vibration from the enabling the audio sensor to monitor for vibration in response to the depth camera determining that the object is within the threshold distance from the physical surface; and surface.

8. The medium of claim 7, wherein detecting a vibration includes performing signal processing of a received vibration.

9. The medium of claim 8, wherein performing signal processing includes comparing the received vibration with a signature for a touch event.

10. The medium of claim 7, wherein projecting the input image on the physical surface includes projecting a graphical user interface (GUI) on the surface.

* * * * *